(12) United States Patent
Gorokhov

(10) Patent No.: US 8,792,601 B2
(45) Date of Patent: Jul. 29, 2014

(54) NON-COHERENT COMBINING DETECTION WITH REDUCED BUFFERING REQUIREMENTS

(75) Inventor: Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 13/252,922

(22) Filed: Oct. 4, 2011

(65) Prior Publication Data

US 2013/0083877 A1   Apr. 4, 2013

(51) Int. Cl.
*H04L 7/00* (2006.01)

(52) U.S. Cl.
USPC .............................. 375/354; 327/141; 370/503

(58) Field of Classification Search
USPC .......................................................... 375/354
See application file for complete search history.

(56) References Cited

U.S. PATENT DOCUMENTS

| | | | |
|---|---|---|---|
| 7,852,760 B2 | 12/2010 | Wang et al. | |
| 7,912,999 B2 | 3/2011 | Boesel et al. | |
| 8,189,541 B2 * | 5/2012 | Swarts et al. | 370/336 |
| 2007/0098017 A1 * | 5/2007 | Lundby et al. | 370/474 |
| 2007/0230590 A1 * | 10/2007 | Choi et al. | 375/260 |
| 2007/0268869 A1 * | 11/2007 | Lundby et al. | 370/332 |
| 2008/0025116 A1 * | 1/2008 | Choi et al. | 365/193 |
| 2008/0137527 A1 * | 6/2008 | Bick et al. | 370/210 |
| 2008/0279322 A1 * | 11/2008 | Franovici et al. | 375/371 |
| 2009/0046626 A1 | 2/2009 | Shao et al. | |
| 2009/0168793 A1 * | 7/2009 | Fox et al. | 370/412 |
| 2011/0007718 A1 * | 1/2011 | Swarts et al. | 370/336 |
| 2011/0103534 A1 * | 5/2011 | Axmon et al. | 375/371 |
| 2011/0201334 A1 * | 8/2011 | Rosenqvist et al. | 455/436 |
| 2011/0223901 A1 * | 9/2011 | Swarts et al. | 455/422.1 |
| 2011/0243104 A1 * | 10/2011 | Swarts et al. | 370/336 |
| 2011/0243105 A1 * | 10/2011 | Swarts et al. | 370/336 |
| 2011/0305285 A1 * | 12/2011 | Debbah et al. | 375/260 |
| 2012/0069834 A1 * | 3/2012 | Ancora et al. | 370/343 |
| 2012/0140644 A1 * | 6/2012 | Ngai et al. | 370/252 |
| 2012/0170629 A1 * | 7/2012 | Park et al. | 375/224 |
| 2012/0231790 A1 * | 9/2012 | Lindoff et al. | 455/434 |
| 2012/0275379 A1 * | 11/2012 | Swarts et al. | 370/328 |
| 2012/0281792 A1 * | 11/2012 | Swarts et al. | 375/343 |
| 2013/0080043 A1 * | 3/2013 | Ballin et al. | 701/120 |

FOREIGN PATENT DOCUMENTS

WO      2010087174 A1    5/2010

OTHER PUBLICATIONS

International Search Report and Written Opinion—PCT/US2012/058808—ISA/EPO—Jan. 22, 2013.

* cited by examiner

*Primary Examiner* — Santiago Garcia

(74) *Attorney, Agent, or Firm* — Patterson & Sheridan, L.L.P.

(57) ABSTRACT

Certain aspects of the present disclosure provide techniques for reducing the amount of storage needed for detecting a primary synchronization signal (PSS). According to certain aspects, a user equipment may store a limited number of samples corresponding to the strongest peaks per PSS index and perform PSS detection based on an analysis of the limited number of stored samples.

26 Claims, 7 Drawing Sheets

NON-COHERENT COMBINING DETECTION WITH REDUCED BUFFERING REQUIREMENTS

BACKGROUND

I. Field

The present disclosure relates generally to communication, and more specifically to techniques performing detection of a signal based on an analysis of a limited number of samples stored in a buffer.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

Various reference signals (RSs), known to the UEs, may be transmitted in the downlink, for example, to facilitate channel estimation. In some cases, cell-specific RSs are provided, which are common to all UEs in a cell. In addition, UE-specific RSs may also be transmitted, embedded in data targeting specific UEs. Further, Multimedia Broadcast Single Frequency Network (MBSFN) -specific RSs may also be provided in case of MBSFN configurations. These RSs typically occupy specified Resource Elements (REs) within an Orthogonal Frequency Division Multiplexed (OFDM) symbol.

SUMMARY

Certain aspects of the present disclosure provide a method for wireless communication. The method generally includes obtaining samples of a received signal across one or more reference pilot intervals, for each reference pilot interval, evaluating a plurality of timing hypotheses for one or more PSSs, based on the samples, and storing a limited number of samples corresponding to a subset of the evaluated timing hypotheses in a buffer, the subset determined based on the evaluation, and performing PSS detection based on an analysis of the limited number of samples stored in the buffer.

Certain aspects of the present disclosure provide an apparatus for detecting a primary synchronization sequence (PSS). The apparatus generally includes means for obtaining samples of a received signal across one or more reference pilot intervals, means for evaluating, for each reference pilot interval, a plurality of timing hypotheses for one or more PSSs, based on the samples, and storing a limited number of samples corresponding to a subset of the evaluated timing hypotheses in a buffer, the subset determined based on the evaluation, and means for performing PSS detection based on an analysis of the limited number of samples stored in the buffer.

Certain aspects of the present disclosure provide an apparatus for detecting a primary synchronization sequence (PSS). The apparatus generally includes at least one processor configured to obtain samples of a received signal across one or more reference pilot intervals, evaluate, for each reference pilot interval, a plurality of timing hypotheses for one or more PSSs, based on the samples, and store a limited number of samples corresponding to a subset of the evaluated timing hypotheses in a buffer, the subset determined based on the evaluation and for each reference pilot interval, and perform PSS detection based on an analysis of the limited number of samples stored in the buffer; and a memory coupled with the at least one processor.

Certain aspects of the present disclosure provide a computer program product comprising a computer readable medium having instructions stored thereon. The instructions are generally executable by one or more processors for obtaining samples of a received signal across one or more reference pilot intervals, for each reference pilot interval, evaluating a plurality of timing hypotheses for one or more PSSs, based on the samples, and storing a limited number of samples corresponding to a subset of the evaluated timing hypotheses in a buffer, the subset determined based on the evaluation, and performing PSS detection based on an analysis of the limited number of samples stored in the buffer.

DETAILED DESCRIPTION

Certain aspects of the present disclosure provide techniques for reducing the amount of storage needed for detecting a primary synchronization signal (PSS). According to certain aspects, a UE may store a limited number of samples corresponding to the strongest peaks per PSS index and perform PSS detection based on an analysis of the limited number of stored samples.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
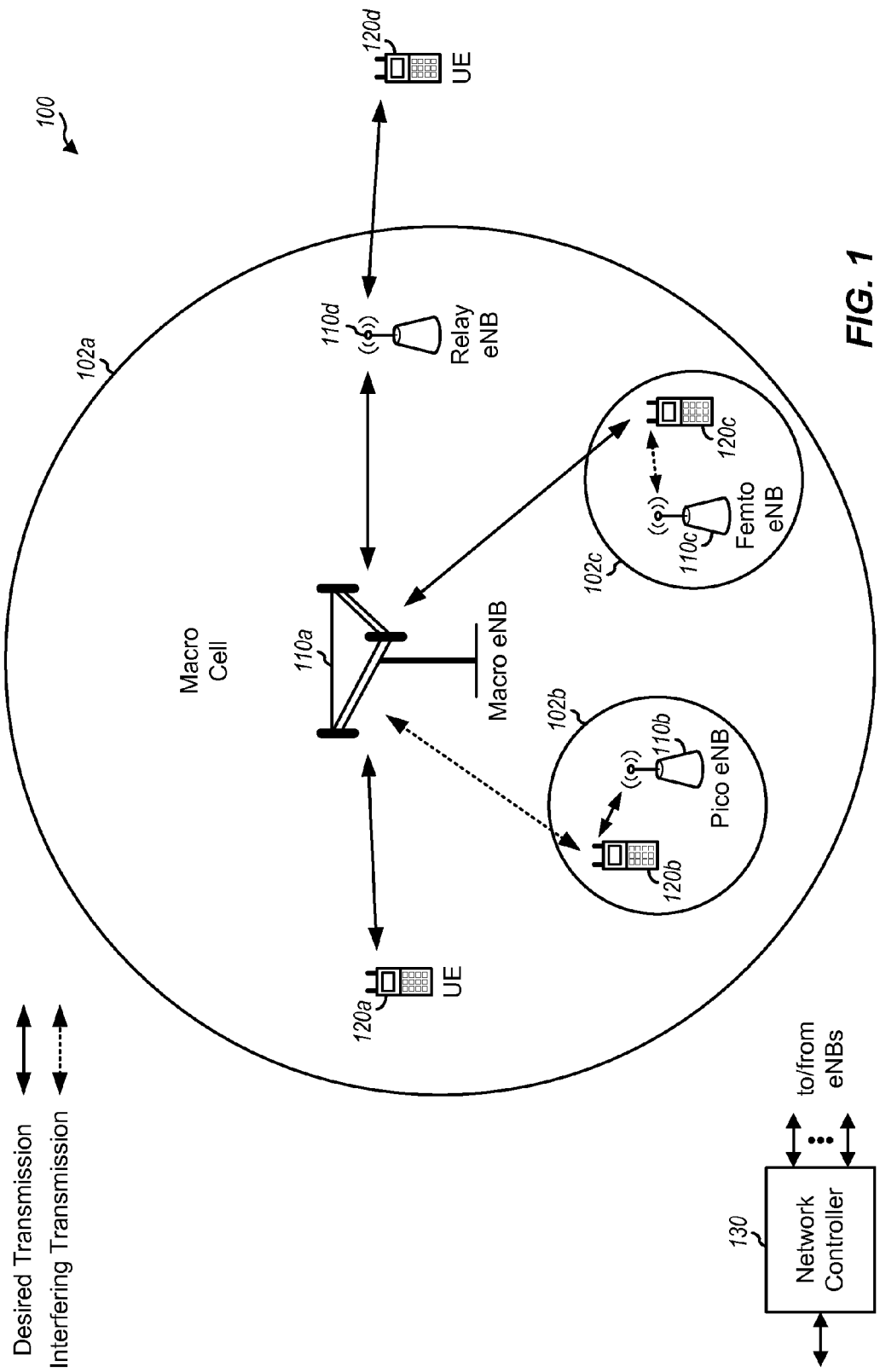
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
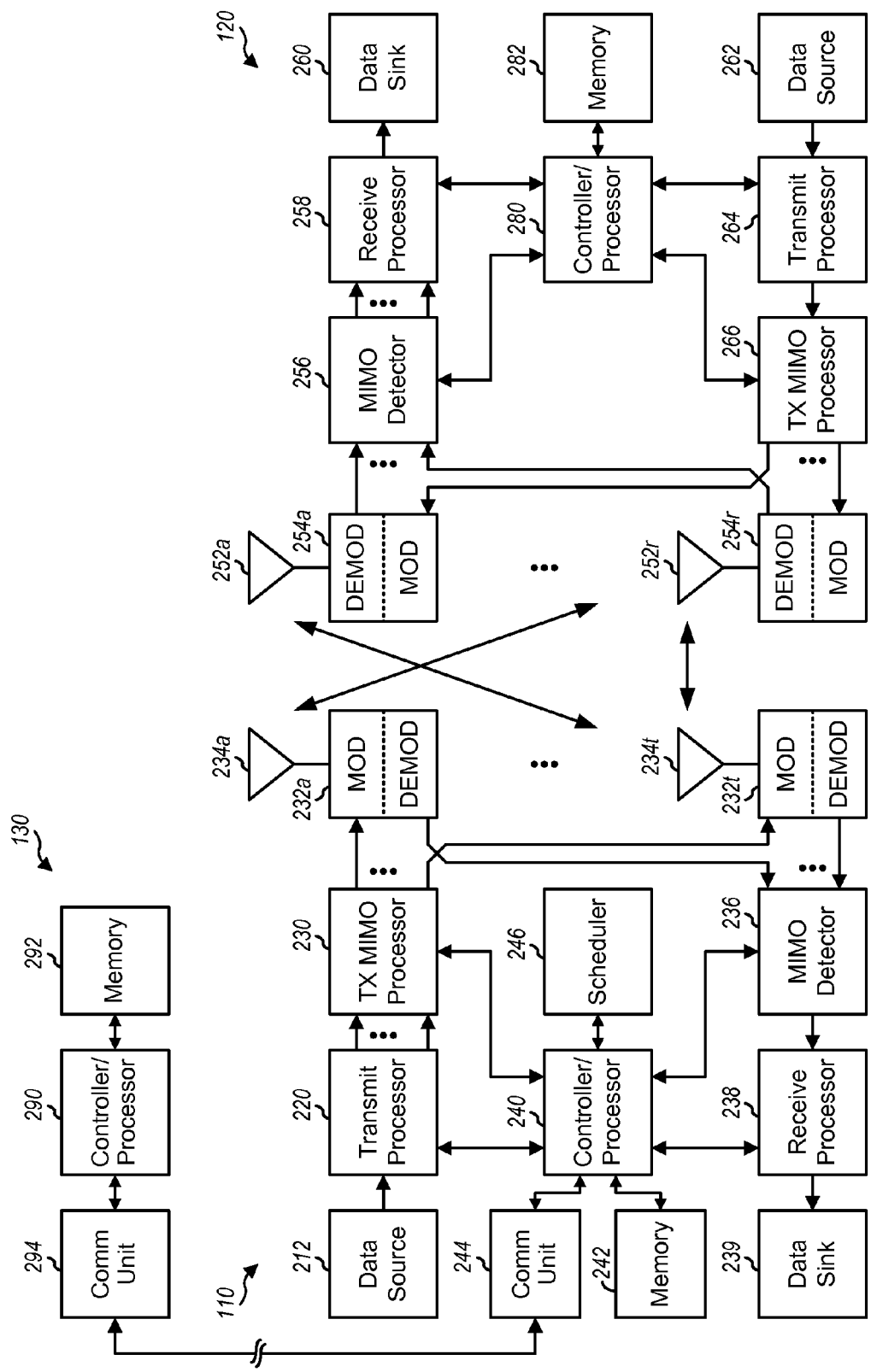
FIG. 2 shows a block diagram of a base station and a UE.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. In accordance with certain aspects of the present disclosure, controller/processor 280 may be configured to perform operations described herein. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 280 and/or other processors and modules at UE 120 may perform or direct operations 600 of FIG. 6, operations 700 of FIG. 7, and/or other processes for the techniques described herein. Memories 242 and 282 may store data and program codes for base station 110 and UE 120, respectively. A scheduler 244 may schedule UEs for data transmission on the downlink and/or uplink.

Figure 3:
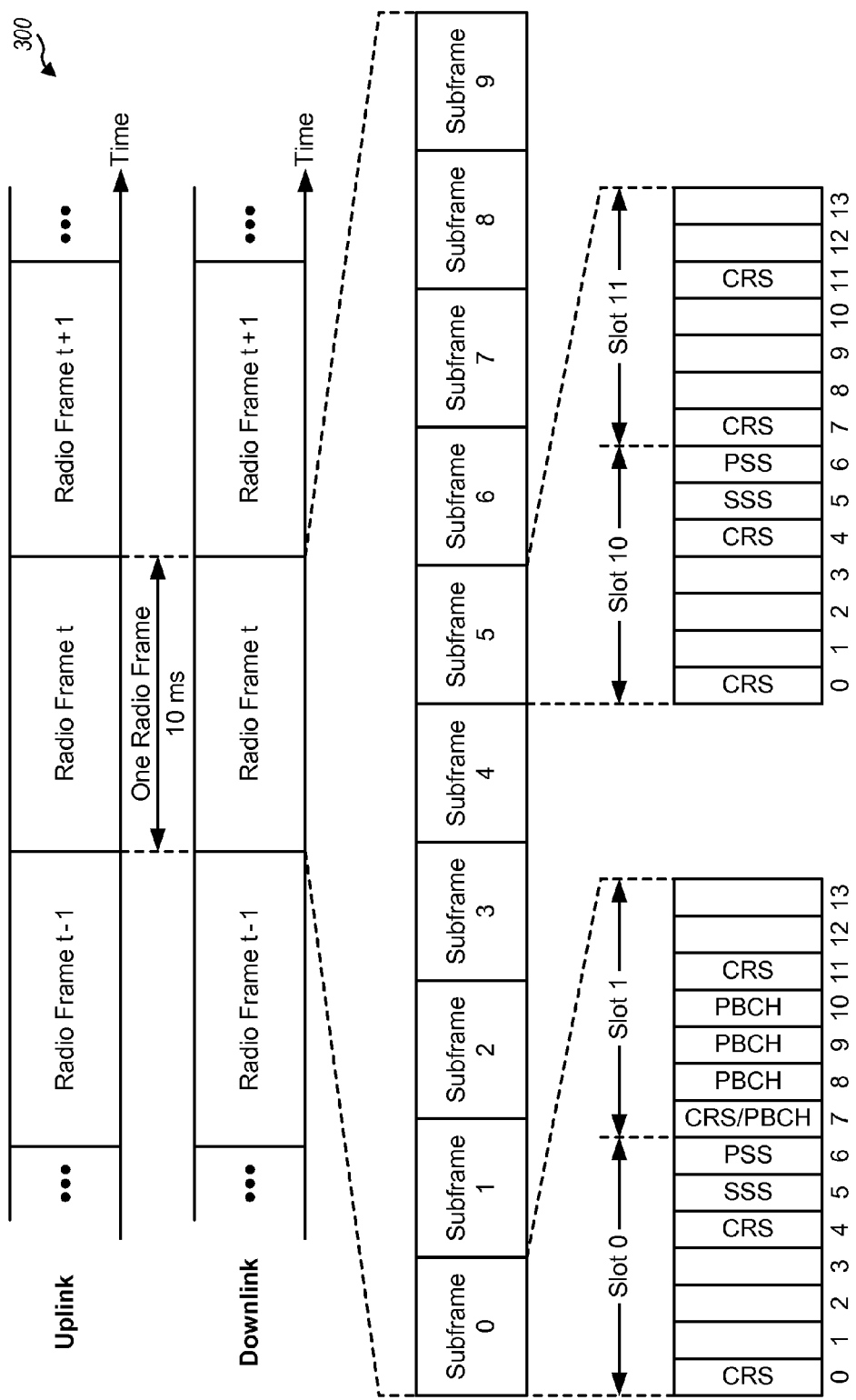
FIG. 3 shows a frame structure for frequency division duplexing (FDD).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a PSS and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. As will be described in greater detail below, certain aspects of the present disclosure may help reduce the size of buffers needed for storing samples for PSS detection.

The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
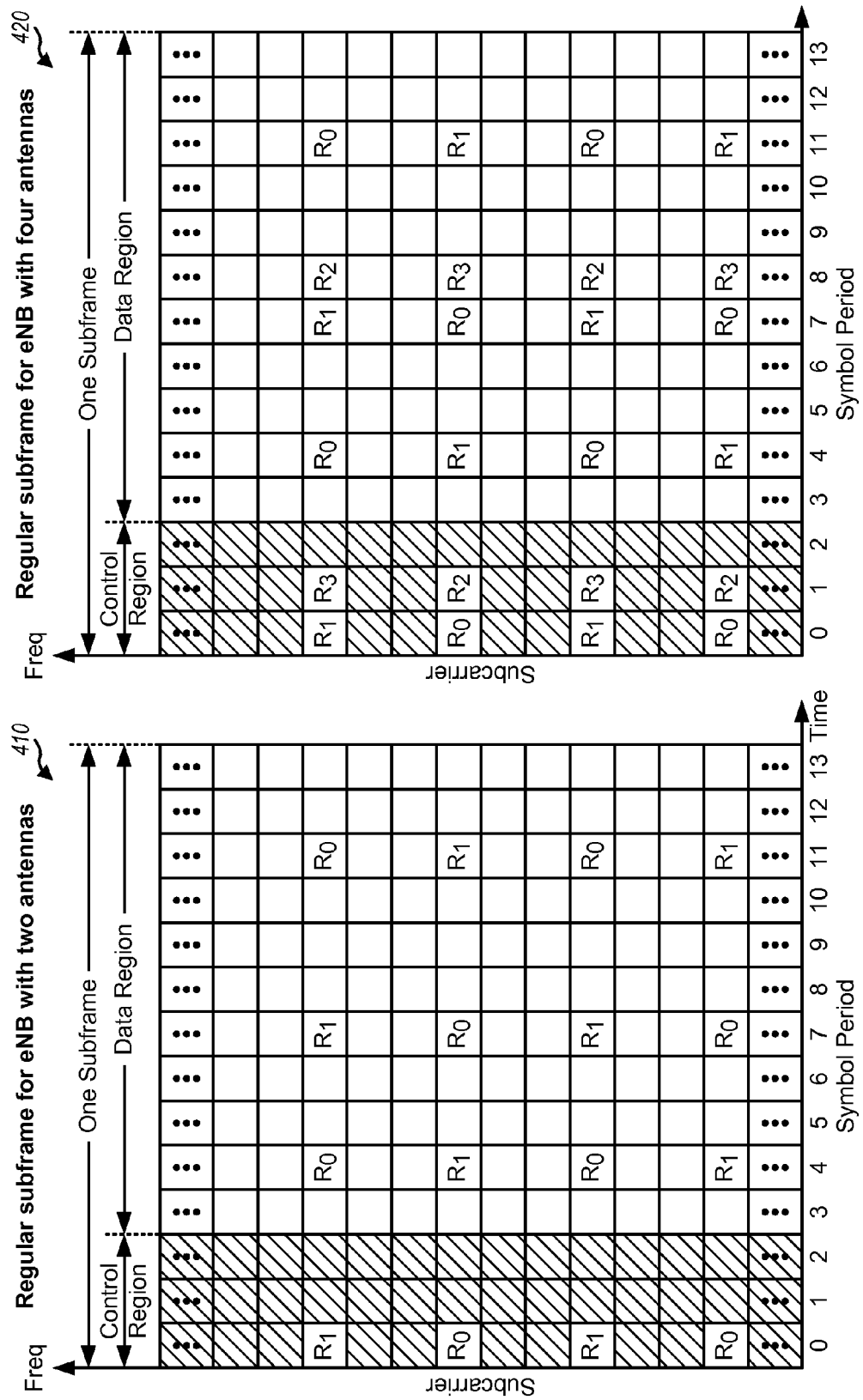
FIG. 4 shows two exemplary subframe formats for the downlink.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Combining Buffer Pruning

Non-coherent combing of samples across multiple pilot intervals may improve detection performance of cell acquisition and cell reselection processes. In LTE, a PSS interval of 5 ms may span 9,600 samples, for example, assuming a sample rate of 1.92 Msps.

Current techniques may store 5 ms (9,600 hypotheses) worth of accumulated peaks for 3 PSS values for subsequent non-coherent PSS combining across half-frames, requiring substantial buffering. For example, buffering 9,600 timing hypotheses per PSS index in a searcher combining buffer may require a buffer of 28.8 K samples.

Certain aspects of the present disclosure, however, provide techniques that may help reduce the amount of buffer storage needed to detect one or more PSSs while maintaining performance benefits of non-coherent combining. According to certain aspects, storing a limited number of samples may reduce the searcher combining buffer size by a factor of nearly 17.

Aspects of the present disclosure provide techniques that may allow a relatively smaller buffer to be maintained with only a limited subset of samples (e.g., of only the strongest samples) obtained by a UE in a reference pilot interval. According to certain aspects, the buffer may store a reduced number of samples, for example 256 samples instead of 9,600 samples, corresponding to winning hypotheses. Winning hypotheses may correspond to the strongest peaks per PSS index found so far.

As a result, a relatively smaller buffer may be maintained by resorting the newly arriving samples during the reference pilot interval, storing samples corresponding to a limited number of strongest hypotheses, and overwriting samples corresponding to weak hypotheses. The reduced number of strongest samples stored in the buffer may be considered for non-coherent combining by subsequent pilot intervals.

Figure 5:
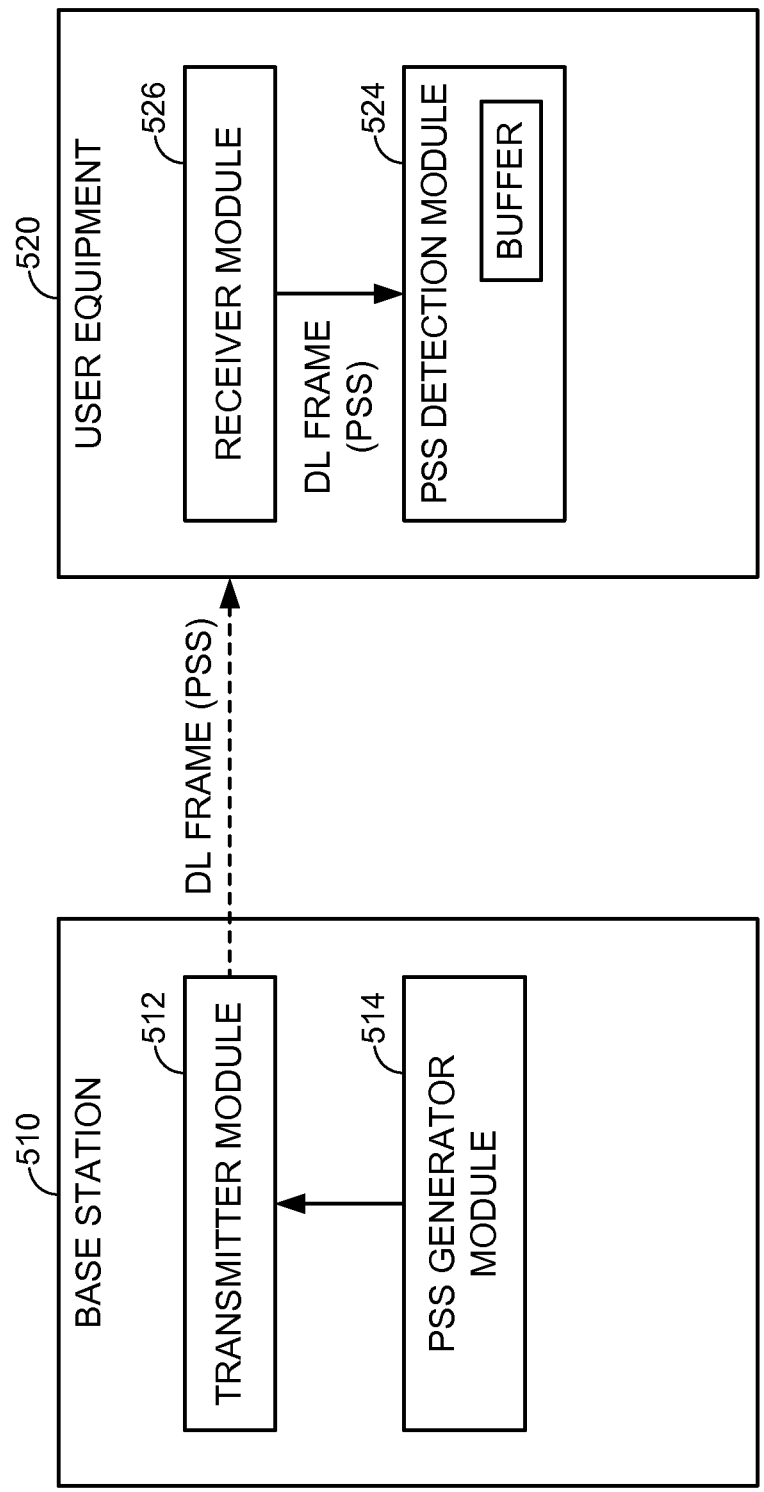
FIG. 5 shows an exemplary base station and user equipment.

FIG. 5 illustrates an example wireless system 500 with a base station (or eNodeB) 510 and UE 520 capable of performing PSS detection based on analyzing a limited number of stored samples, in accordance with aspects of the present disclosure.

According to certain aspects, the base station 510 may include a PSS generator module 514. The PSS generator module 514 may be generally configured to generate a PSS to assist a UE in carrying out a cell search. The transmitter module 512 may transmit the PSS via a downlink frame to UE 520.

The UE 520 may receive the PSS (e.g., transmitted in a downlink frame), via a receiver module 526 and send the frame to PSS detection module 524. PSS detection module 524 may comprise one or more buffers. According to certain embodiments, the PSS detection module may comprise a searcher sample buffer and/or a searcher combining buffer. The combining buffer may be a non-coherent combining buffer. The UE 520 may perform PSS detection based on an analysis of the limited number of samples stored in a buffer of PSS detection module 524.

Figure 6:
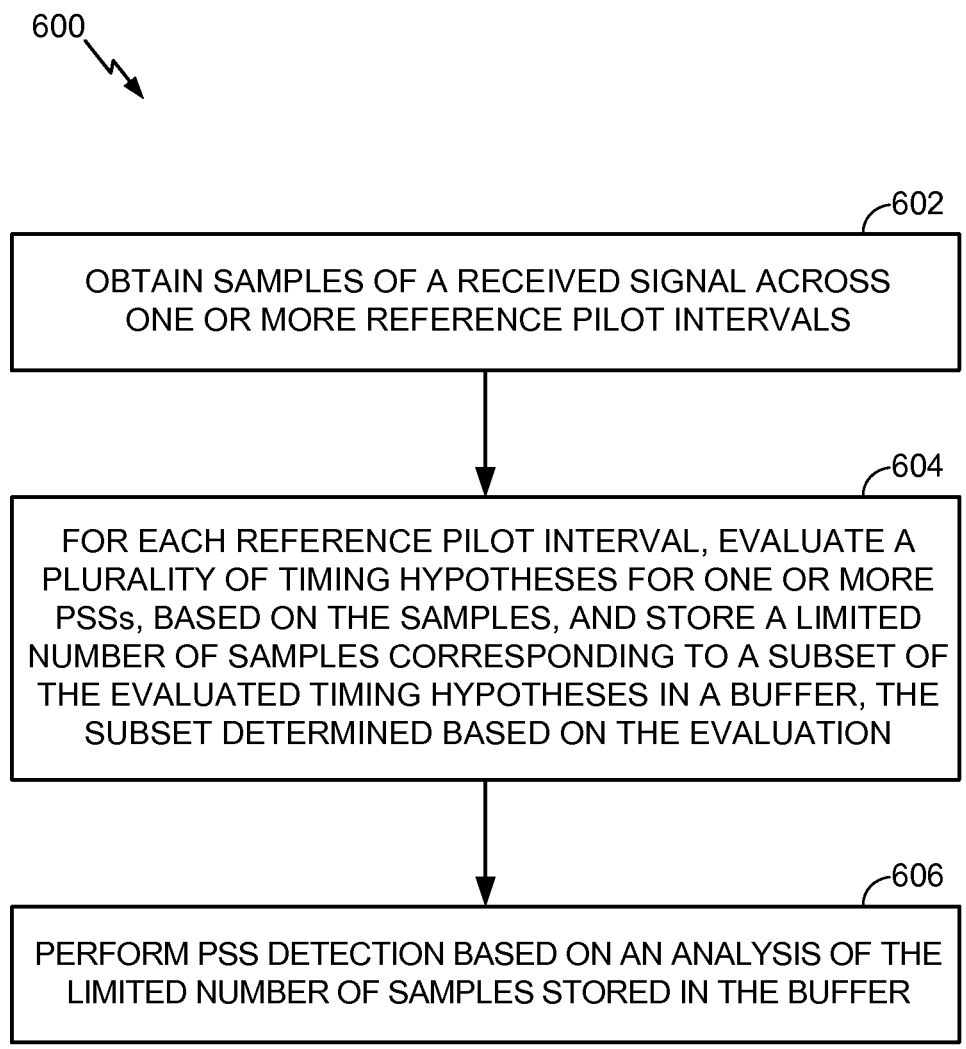
FIGS. 6-7 illustrate example operations that may be performed by a user equipment, in accordance with certain aspects of the present disclosure.

FIG. 6 illustrates example operations 600 that may be performed, for example, by a UE, such as UE 520 of FIG. 5.

The operations 600 begin, at 602, by a UE obtaining samples of a received signal across one or more reference pilot intervals. According to certain aspects, the UE may obtain samples of a received signal across at least two reference pilot intervals. As will be described in greater detail below, the reference pilot interval may be greater than an interval corresponding to a half radio frame.

At 604, for each reference pilot interval, the UE may evaluate a plurality of timing hypotheses for one or more PSSs, based on the samples and store a limited number of samples corresponding to a subset of the evaluated timing hypotheses in a buffer, the subset determined based on the evaluation.

According to certain aspects, the evaluation may be performed only after a threshold number of samples have been stored in the buffer. According to certain aspects, the UE may store samples corresponding to a limited number of strongest hypotheses. For example, for each pilot reference interval, samples corresponding to no more than 256 timing hypotheses may be stored. Storing samples may comprise sorting samples in the buffer, based on strength of corresponding hypotheses, and overwriting samples corresponding to weak hypotheses.

Storing samples may further comprise obtaining a set of new samples (e.g., a fixed number such as 128), evaluating one or more hypotheses based on the new samples, sorting samples in the buffer and the new samples, based on the evaluation, and storing only samples corresponding to the strongest hypotheses. This may help avoid having to re-sort after every sample. According to certain aspects, the one or more PSSs may comprise at least three PSSs.

At 606, the UE may perform PSS detection based on an analysis of the limited number of samples stored in the buffer. Performing PSS detection may comprise non-coherent combining of samples corresponding to the subset of hypotheses for at least two reference pilot intervals.

Figure 7:
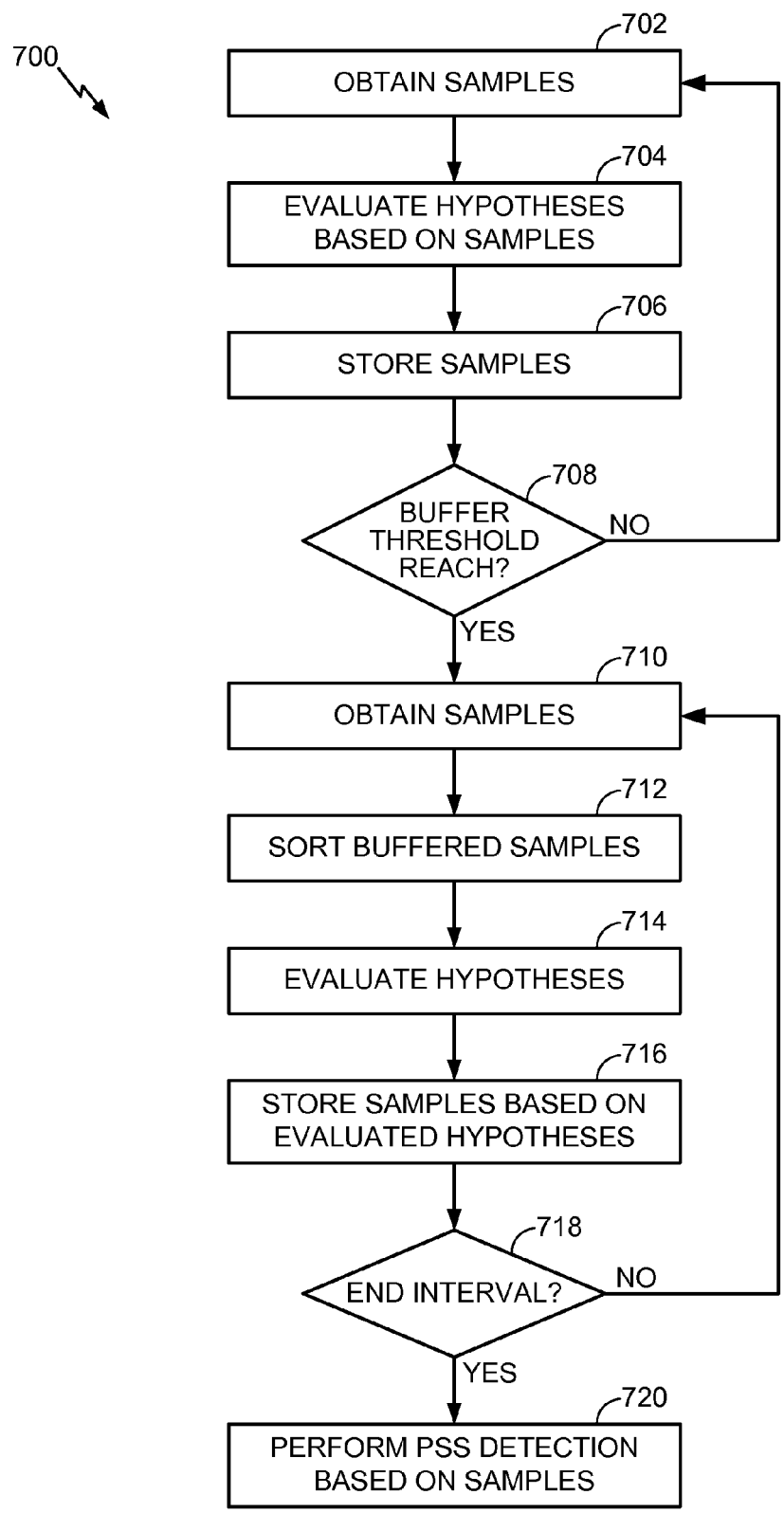

FIG. 7 illustrates example operations 700 that may be performed, for example, by a UE, such as UE 520 of FIG. 5. The operations 700 may correspond to details of how samples may efficiently be re-sorted.

At 702, a UE may obtain samples of a received signal. Samples may be received across one or more reference pilot intervals. According to certain embodiments, the UE may obtain samples of a received signal across at least two reference pilot intervals. The reference pilot interval may be greater than an interval corresponding to a half radio frame.

At 704, the UE may evaluate a plurality of timing hypotheses for one or more PSS for each reference pilot interval. The one or more PSSs may comprise at least three PSSs. According to certain embodiments, the UE may evaluate hypotheses after a threshold number of samples have been stored in a buffer.

At 706, the UE may store a limited number of samples corresponding to strongest hypotheses in a buffer. According to certain embodiments, the strongest hypotheses may correspond to PSS peaks. PSS peaks may be computed prior to energy combining across multiple receive antennas. Each per-antenna sample associated with a given timing may be obtained by correlating received samples (e.g., from a sample server) corresponding to the defined timing and the referenced PSS sequence. According to certain embodiments, storing samples may include storing the address (e.g., timing index) of the limited number of samples corresponding to the strongest hypotheses.

At 708, the UE may determine if a buffer threshold has been reached. The buffer threshold may correspond to a predetermined number of stored samples. If the buffer threshold has not been reached, the UE may continue to obtain samples at 702.

Once the buffer threshold is reached, at 710, the UE may obtain newly arriving samples. At 712, the UE may sort buffered samples based on the strengths of the corresponding hypotheses. At 714, the UE may evaluate one or more hypotheses based on the newly arriving samples. The UE may sort samples in the buffer and the new samples based on the evaluated hypotheses. At 716, the UE may store samples, for example, based on the strength of the corresponding hypotheses.

According to certain embodiments, storing samples may also comprise overwriting samples corresponding to weak hypotheses. According to certain embodiments, for each reference interval, samples corresponding to no more than 256 timing hypotheses may be stored. At 718, the UE may determine if the end of a reference pilot interval has been reached.

If the end of a reference pilot interval has been reached, the UE may, at 720, perform PSS detection based on the limited number of stored samples. According to aspects of the present disclosure, a UE may perform some form of combining across multiple receive antennas to generate a value that may be used to perform PSS detection. Non-coherent (e.g., energy) combining across antennas may include adding squared absolute values of the signals from the multiple receive antennas to generate a combined value. According to certain aspects, noise whitening may be performed prior to energy combining across receive antennas. Noise whitening may include applying an M×M whitening matrix to the M receiver antenna outputs prior to energy combining. The whitening matrix may be obtained by performing an inverse square root of the estimated noise covariance matrix.

According to certain embodiments, performing PSS detection may comprise non-coherent combining of samples corresponding to the subset of hypotheses for at least two reference pilot intervals. Non-coherent combining may be performed using the stored addresses of the strongest hypotheses and the peak values. The addresses may be used to report the locations of the detected peaks at the end of the detection procedure, after non-coherent combining. If the end of the reference interval has not been reached, the UE may continue to obtain samples at 710.

According to an embodiment, a buffer may maintain a limited number of strongest PSS samples over a search interval of 5 ms. The buffer may tentatively maintain 256 timing hypotheses per PSS index for a total of 768 hypotheses.

By resorting hypotheses as new samples arrive, a buffer of 256 hypotheses per PSS index may contain the 256 strongest peaks per PSS index found so far. The UE may process the next 120 arriving samples by extending the buffer to include the next 120 samples, for a total of 376 samples. The UE may resort the 376 samples and drop the 120 samples corresponding to weak hypotheses to maintain a buffer of 256 hypotheses. The UE may perform non-coherent combining of two or more half radio frames to improve detection performance of cell acquisition and/or cell reselection.

According to an embodiment, after a first reference pilot interval, from which 256 strongest samples per PSS may be identified and stored, new peaks for subsequent reference pilot intervals may be based on energy combining across multiple receive antennas. The new peaks, corresponding to the stored addresses of the strongest hypotheses may be added to the contents of a buffer. Such non-coherent combining may repeat for a pre-defined number reference pilot intervals. The pre-defined number of reference pilot intervals may be set to any integer. According to an embodiment, PSS detection may be performed by retaining a sub-set of combined peaks that exceed a threshold. According to yet another embodiment, PSS detection may be performed by taking a limited number of strongest peaks (e.g., on the order of 20-30) into a subsequent SSS search.

According to an embodiment, the list of strongest hypotheses may be updated in subsequent reference pilot intervals. For example, the list of strongest hypotheses may be updated if the values of the peaks detected in subsequent reference pilot intervals exceed the peaks identified in the initial reference pilot interval. According to an embodiment, an existing strongest peak determined in a reference pilot interval n may be replaced in a later reference pilot interval m by a new peak when the ratio of the new peak value to the previous winning peak value exceeds a threshold. The threshold may be dependent on (n, m).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for detecting a primary synchronization sequence, comprising:
    obtaining samples of a received signal across one or more reference pilot intervals;
    for each reference pilot interval, evaluating a plurality of timing hypotheses for one or more primary synchronization sequences, based on the samples, and storing a limited number of samples corresponding to a subset of the evaluated timing hypotheses in a buffer, the subset determined based on the evaluation; and
    performing primary synchronization sequence detection based on an analysis of the limited number of samples stored in the buffer.

2. The method of claim 1, wherein:
    the obtaining comprises obtaining samples of the received signal across at least two reference pilot intervals; and
    performing the primary synchronization sequence detection comprises non-coherent combining of samples corresponding to the subset of hypotheses for the at least two reference pilot intervals.

3. The method of claim 2, wherein:
    the non-coherent combining is performed over a number of half-frames following an initial half-frame for which the limited number of samples are stored.

4. The method of claim 1, wherein the evaluation is performed only after a threshold number of samples have been stored in the buffer.

5. The method of claim 1, wherein storing a limited number of samples comprises:
    storing samples corresponding to a limited number of strongest hypotheses.

6. The method of claim 5, wherein the storing comprises: overwriting samples corresponding to weak hypotheses.

7. The method of claim 5, wherein storing a limited number of samples comprises:
    sorting samples in the buffer, based on strength of corresponding hypotheses.

8. The method of claim 7, wherein storing a limited number of samples further comprises:
    obtaining a set of new samples;
    evaluating one or more hypotheses based on the new samples;
    sorting samples in the buffer and the new samples, based on the evaluation; and
    storing only samples corresponding the strongest hypotheses.

9. The method of claim 1, wherein the reference pilot interval is greater than an interval corresponding to a half radio frame.

10. The method of claim 1, wherein the one or more primary synchronization sequences comprise at least three primary synchronization sequences.

11. The method of claim 1, wherein, for each pilot reference interval, samples corresponding to no more than 256 timing hypotheses are stored.

12. The method of claim 1, wherein storing a limited number of samples comprises storing timing indices corresponding to the limited number of samples.

13. An apparatus for detecting a primary synchronization sequence, comprising:
    means for obtaining samples of a received signal across one or more reference pilot intervals;
    means for evaluating, for each reference pilot interval, a plurality of timing hypotheses for one or more primary synchronization sequences, based on the samples, and storing a limited number of samples corresponding to a subset of the evaluated timing hypotheses in a buffer, the subset determined based on the evaluation; and
    means for performing primary synchronization sequence detection based on an analysis of the limited number of samples stored in the buffer.

14. The apparatus of claim 13, wherein:
    the obtaining comprises obtaining samples of the received signal across at least two reference pilot intervals; and
    performing the primary synchronization sequence detection comprises non-coherent combining of samples corresponding to the subset of hypotheses for the at least two reference pilot intervals.

15. The apparatus of claim 14, wherein:
    the non-coherent combining is performed over a number of half-frames following an initial half-frame for which the limited number of samples are stored.

16. The apparatus of claim 13, wherein the evaluation is performed only after a threshold number of samples have been stored in the buffer.

17. The apparatus of claim 13, wherein storing a limited number of samples comprises:
    storing samples corresponding to a limited number of strongest hypotheses.

18. The apparatus of claim 17, wherein the storing comprises:
    overwriting samples corresponding to weak hypotheses.

19. The apparatus of claim 17, wherein storing a limited number of samples comprises:
    sorting samples in the buffer, based on strength of corresponding hypotheses.

20. The apparatus of claim 19, wherein storing a limited number of samples further comprises:
    obtaining a set of new samples;
    evaluating one or more hypotheses based on the new samples;
    sorting samples in the buffer and the new samples, based on the evaluation; and
    storing only samples corresponding the strongest hypotheses.

21. The apparatus of claim 13, wherein the reference pilot interval is greater than an interval corresponding to a half radio frame.

22. The apparatus of claim 13, wherein the one or more primary synchronization sequences comprise at least three primary synchronization sequences.

23. The apparatus of claim 13, wherein, for each pilot reference interval, samples corresponding to no more than 256 timing hypotheses are stored.

24. The apparatus of claim 13, wherein storing a limited number of samples comprises storing timing indices corresponding to the limited number of samples.

25. An apparatus for detecting a primary synchronization sequence, comprising:
- at least one processor configured to obtain samples of a received signal across one or more reference pilot intervals, evaluate, for each reference pilot interval, a plurality of timing hypotheses for one or more primary synchronization sequences, based on the samples, and store a limited number of samples corresponding to a subset of the evaluated timing hypotheses in a buffer, the subset determined based on the evaluation, and perform primary synchronization sequence detection based on an analysis of the limited number of samples stored in the buffer; and
- a memory coupled with the at least one processor.

26. A computer program product comprising a non-transitory computer readable medium having instructions stored thereon, the instructions executable by one or more processors for:
- obtaining samples of a received signal across one or more reference pilot intervals;
- for each reference pilot interval, evaluating a plurality of timing hypotheses for one or more primary synchronization sequences, based on the samples, and storing a limited number of samples corresponding to a subset of the evaluated timing hypotheses in a buffer, the subset determined based on the evaluation; and
- performing primary synchronization sequence detection based on an analysis of the limited number of samples stored in the buffer.

\* \* \* \* \*